(12) United States Patent
Ueda

(10) Patent No.: US 11,339,924 B2
(45) Date of Patent: May 24, 2022

(54) METHOD FOR PRODUCING HIGH-PRESSURE TANK

(71) Applicant: TOYOTA JIDOSHA KABUSHIKI KAISHA, Toyota (JP)

(72) Inventor: Naoki Ueda, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 16/818,711

(22) Filed: Mar. 13, 2020

(65) Prior Publication Data

US 2020/0309321 A1 Oct. 1, 2020

(30) Foreign Application Priority Data

Apr. 1, 2019 (JP) .............................. JP2019-069917

(51) Int. Cl.
| | | |
|---|---|---|
| *B29C 70/68* | (2006.01) | |
| *B29C 70/70* | (2006.01) | |
| *F17C 1/06* | (2006.01) | |
| *F17C 1/16* | (2006.01) | |
| *B29C 53/58* | (2006.01) | |

(52) U.S. Cl.
CPC ................ *F17C 1/06* (2013.01); *B29C 53/58* (2013.01); *B29C 70/681* (2013.01); *B29C 70/70* (2013.01); *F17C 1/16* (2013.01); *F17C 2203/0604* (2013.01); *F17C 2203/0673* (2013.01); *F17C 2209/2154* (2013.01)

(58) Field of Classification Search
None
See application file for complete search history.

(56) References Cited

U.S. PATENT DOCUMENTS

| | | | | |
|---|---|---|---|---|
| 3,132,416 A | * | 5/1964 | Hait | ..................... B29C 67/00 29/429 |
| 2014/0131365 A1 | * | 5/2014 | Miyoshi | ............... B29C 70/086 220/590 |
| 2018/0229449 A1 | | 8/2018 | Ueda et al. | |

FOREIGN PATENT DOCUMENTS

| | | |
|---|---|---|
| CN | 103620291 A | 3/2014 |
| DE | 11 2012 002 720 T5 | 4/2014 |
| DE | 10 2018 101 372 A1 | 8/2018 |
| JP | 2009-222195 | 10/2009 |
| JP | 2011-144860 | 7/2011 |
| JP | 2018-171717 | 11/2018 |

* cited by examiner

*Primary Examiner* — Christopher T Schatz
(74) *Attorney, Agent, or Firm* — Finnegan, Henderson, Farabow, Garrett & Dunner, LLP

(57) ABSTRACT

A method for producing a high-pressure tank capable of suppressing break of a surface resin layer due to gas pressure as well as degradation in the tank quality. The method includes winding a thermosetting resin-impregnated fiber bundle around a liner so as to form an uncured fiber-reinforced resin layer thereon, first heating in which the uncured fiber-reinforced resin layer is locally heated at a first temperature so as to leach the thermosetting resin out of the uncured fiber-reinforced resin layer to form the surface resin layer, and the surface resin layer is cured to have cracks generated therein, and second heating in which the tank is entirely heated at a second temperature lower than the first temperature, so that the fiber-reinforced resin layer and surface resin layer are entirely cured, so as to obtain the tank with the surface resin layer locally having cracks generated therein.

3 Claims, 6 Drawing Sheets

METHOD FOR PRODUCING HIGH-PRESSURE TANK

CROSS REFERENCE TO RELATED APPLICATIONS

The present application claims priority from Japanese patent application JP 2019-069917 filed on Apr. 1, 2019, the entire content of which is hereby incorporated by reference into this application.

BACKGROUND

Technical Field

The present disclosure relates to a method for producing a high-pressure tank including a fiber-reinforced resin layer formed by winding a thermosetting resin-impregnated fiber bundle around a resin liner.

Background Art

As a high-pressure tank (a high-pressure gas storage container) used for storage and supply of hydrogen or the like, a tank including a tank body with a mouthpiece attached to its open end in the longitudinal direction has conventionally been known. The tank body includes, for example, a liner for hermetically retaining therein a hydrogen gas and a fiber-reinforced resin layer formed by winding a fiber bundle of carbon fiber reinforced plastics (CFRP) or the like around the outer periphery surface of the liner so as to reinforce the liner.

A method for producing a high-pressure tank that has been known includes winding a fiber bundle around the outer surface of a liner using, for example, a filament winding technique (hereinafter also simply referred to as the "FW technique"), so as to form an uncured fiber-reinforced resin layer, and then heating the fiber-reinforced resin layer so as to cure it. When the uncured fiber-reinforced resin layer is cured by heating, a thermosetting resin leaches out of the uncured fiber-reinforced resin layer, so that a surface resin layer covering the fiber-reinforced resin layer is formed.

There is no resin liner that can completely block gas, and in such a resin liner, gas that has filled the liner permeates through the liner over time. Meanwhile, since the surface resin layer has a gas blocking function (a gas barrier property), the gas that has permeated through the liner is blocked by the surface resin layer made of resin only. When the gas that has permeated through the liner is blocked by the surface resin layer, and the gas pressure inside the fiber-reinforced resin layer reaches the limit, the surface resin layer may break, causing the gas to be suddenly released to the outside. When this occurs, the amount of the gas released is not a concern in terms of safety, but strange noise is generated due to the break of the surface resin layer.

To overcome such drawbacks, JP 2011-144860 A, for example, discloses a high-pressure tank having a surface resin layer entirely formed to have a porous structure by applying a solvent over the entire uncured surface resin layer so as to cause the solvent to permeate therethrough, and then subjecting the uncured surface resin layer to heat treatment. In this high-pressure tank, since the gas that has permeated through the liner also permeates through the surface resin layer, the gas is not suddenly released due to the break of the surface resin layer.

SUMMARY

However, in the aforementioned high-pressure tank of JP 2011-144860 A, a solvent is applied over the uncured surface resin layer. Thus, if the solvent also reaches and permeates through the fiber-reinforced resin layer, the quality of the high-pressure tank may be deteriorated.

The present disclosure has been made in view of the foregoing, and provides a method for producing a high-pressure tank that is capable of suppressing the break of the surface resin layer due to the gas pressure as well as deterioration in the quality of the high-pressure tank.

The present disclosure provides a method for producing a high-pressure tank having a resin liner, a fiber-reinforced resin layer covering the outer surface of the liner, and a surface resin layer covering the outer surface of the fiber-reinforced resin layer, the method including winding a thermosetting resin-impregnated fiber bundle around the outer surface of the liner so as to form an uncured fiber-reinforced resin layer on the outer surface of the liner, first heating in which the uncured fiber-reinforced resin layer is locally heated at a first temperature, so that a thermosetting resin leaches out of the heated region of the uncured fiber-reinforced resin layer so as to form the surface resin layer, and the surface resin layer is cured so as to have cracks generated therein as well, and second heating in which subsequent to the first heating, the high-pressure tank is entirely heated at a second temperature lower than the first temperature, so that the fiber-reinforced resin layer and the surface resin layer containing the thermosetting resin that has leached out of the entire fiber-reinforced resin layer are entirely cured, so as to obtain the high-pressure tank with the surface resin layer locally having the cracks generated therein.

The method for producing a high-pressure tank of the present disclosure includes the first heating in which the uncured fiber-reinforced resin layer is locally heated at a first temperature, so that the thermosetting resin leaches out of the heated region of the uncured fiber-reinforced resin layer so as to form the surface resin layer, and the surface resin layer is cured so as to have cracks generated therein, and the second heating in which the high-pressure tank is entirely heated so as to obtain the high-pressure tank with the surface resin layer locally having the cracks generated therein. In a high-pressure tank produced as such, the gas (the gas inside the fiber-reinforced resin layer) that has permeated through the liner can be released to the outside through the cracks in the surface resin layer, and thus, sudden release of the gas, which would otherwise occur if the surface resin layer breaks due to the increased gas pressure inside the fiber-reinforced resin layer, can be suppressed. As a result, strange noise generated by the break of the surface resin layer can also be suppressed.

Further, since a solvent need not be applied over the uncured surface resin layer, the quality of the high-pressure tank is not deteriorated due to a solvent penetrating through the fiber-reinforced resin layer.

In the aforementioned method for producing a high-pressure tank, the region to be locally heated in the first heating may include an end of the fiber bundle that is wound. In such a method, a step of securing the end of the wound fiber bundle need not be provided separately from the first heating, and thus, the production time can be reduced. In addition, since cracks are generated along both the lateral direction (the width direction of the fiber bundle) and the longitudinal direction at the end of the wound fiber bundle, the gas inside the fiber-reinforced resin layer can surely be released to the outside through the cracks in the surface resin layer.

In some embodiments of the aforementioned method for producing a high-pressure tank, the first heating may include heating the uncured fiber-reinforced resin layer by locally blowing hot air to the uncured fiber-reinforced resin layer. This can easily and locally heat the uncured fiber-reinforced resin layer.

The present disclosure provides a method for producing a high-pressure tank that is capable of suppressing the break of the surface resin layer due to the gas pressure as well as degradation in the quality of the high-pressure tank.

DETAILED DESCRIPTION

With reference to the drawings, a method for producing a high-pressure tank 10 according to an embodiment of the present disclosure is described below. The high-pressure tank 10 is described below as a tank to be mounted on a fuel cell vehicle and filled with a high-pressure hydrogen gas, but is also applicable to other uses. Further, gas that can be used to fill the high-pressure tank 10 is not limited to the high-pressure hydrogen gas.

Figure 1:
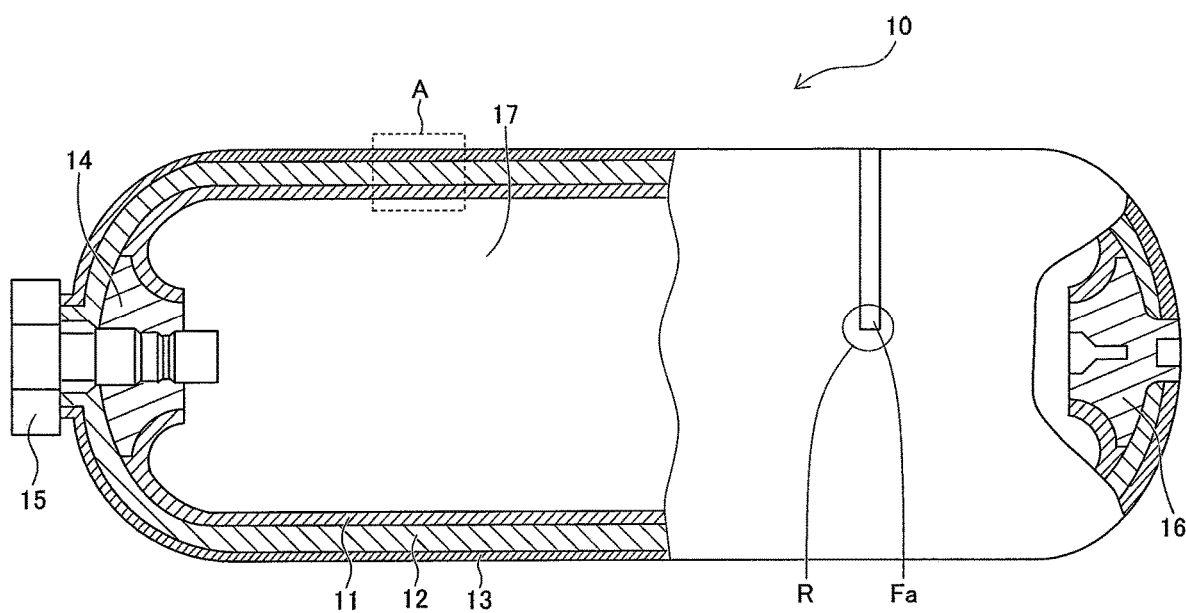
FIG. 1 is a partial cross-sectional view illustrating the structure of a high-pressure tank produced using a method for producing a high-pressure tank according to an embodiment of the present disclosure.

First, the structure of the high-pressure tank 10 is described. As illustrated in FIG. 1, the high-pressure tank 10 is a substantially cylindrical high-pressure gas storage container with dome-like round portions at its opposite ends, and includes a liner 11 having a gas barrier property, a fiber-reinforced resin layer 12, and a surface resin layer 13. Further, the high-pressure tank 10 has openings at its opposite ends, one of the openings having attached thereto a mouthpiece 14 and the other an end boss 16.

The liner 11 is a resin member forming a housing space 17 that is to be filled with a high-pressure hydrogen gas. The liner 11 is typically made of a thermoplastic resin that can be processed into such shapes as a substantially cylindrical shape. The resin of the liner 11 may be easily processed and have a capability of retaining hydrogen gas within the housing space 17, that is, an excellent gas barrier property. Examples of such a resin include a thermoplastic resin, such as polyester, polyamide, polyethylene, and ethylene vinyl alcohol copolymer resin (EVOH).

As described above, the liner 11 is in a substantially cylindrical shape with dome portions at its opposite ends. The dome portions of the liner 11 have openings formed therein, one of the openings being provided with the mouthpiece 14 and the other the end boss 16. Since the fiber-reinforced resin layer 12 and surface resin layer 13 are formed along the outer surface of the liner 11, the shape of the high-pressure tank 10 is determined by the shape of the liner 11.

The mouthpiece 14 is an outlet for the hydrogen gas filling the housing space 17, and may be provided with a valve 15, for example, and a groove or the like (not illustrated) into which the valve 15 fits. A mouthpiece made of a metal material such as an aluminum alloy machined into a predetermined shape may be used for the mouthpiece 14.

The end boss 16 is a member provided in the dome portion on the opposite side of the mouthpiece 14, and is a member to which a shaft adapted to rotate the liner 11 in forming the fiber-reinforced resin layer 12 is attached. The shaft is attached to the mouthpiece 14 as well as the end boss 16. The end boss 16 may also be made of a metal material such as an aluminum alloy, as with the mouthpiece 14.

The fiber-reinforced resin layer 12, which covers the outer surface of the liner 11, has a function of reinforcing the liner 11 so as to improve the mechanical strength of the high-pressure tank 10, such as the rigidity and pressure resistance. The fiber-reinforced resin layer 12 includes a thermosetting resin and reinforcing fibers. Examples of the thermosetting resin that may be used include a phenol resin, melamine resin, urea resin, and epoxy resin, and in particular, considering the properties, such as the mechanical strength, the epoxy resin may be used. Examples of the reinforcing fibers that may be used include glass fibers, alamido fibers, boron fibers, and carbon fibers, and in particular, considering the properties, such as the lightness and mechanical strength, the carbon fibers may be used.

Typically, the epoxy resin is a resin obtained by mixing a prepolymer such as a copolymer of bisphenol A and epichlorohydrin, and a curing agent such as polyamine, and thermally curing them. The epoxy resin in an uncured state is fluid, but when thermally cured, it forms a solid cross-linked structure.

The fiber-reinforced resin layer 12 is formed by winding a bundle of uncured resin (for example, epoxy resin)-impregnated fibers (for example, carbon fibers) around the outer surface of the liner 11, and curing the uncured resin. For example, a shaft is attached to the mouthpiece 14 and end boss 16 of the liner 11 so as to rotatably support the liner 11, and while the liner 11 is being rotated, the resin-impregnated fiber bundle is wound around the liner 11 helically and in a hoop concurrently. Then, the resin is heated at the curing temperature so that the resin components are cured. Combining the helical winding and hoop winding can secure the mechanical strength, such as the pressure resistance, in the axial and radial directions of the high-pressure tank 10.

The surface resin layer 13 is made of the uncured epoxy resin that has leached out of the fiber-reinforced resin layer 12. Herein, the surface resin layer 13 only includes the resin components that have been extruded to the outside from the fiber-reinforced resin layer 12 while the fiber-reinforced resin layer 12 is being heated.

Figure 2:
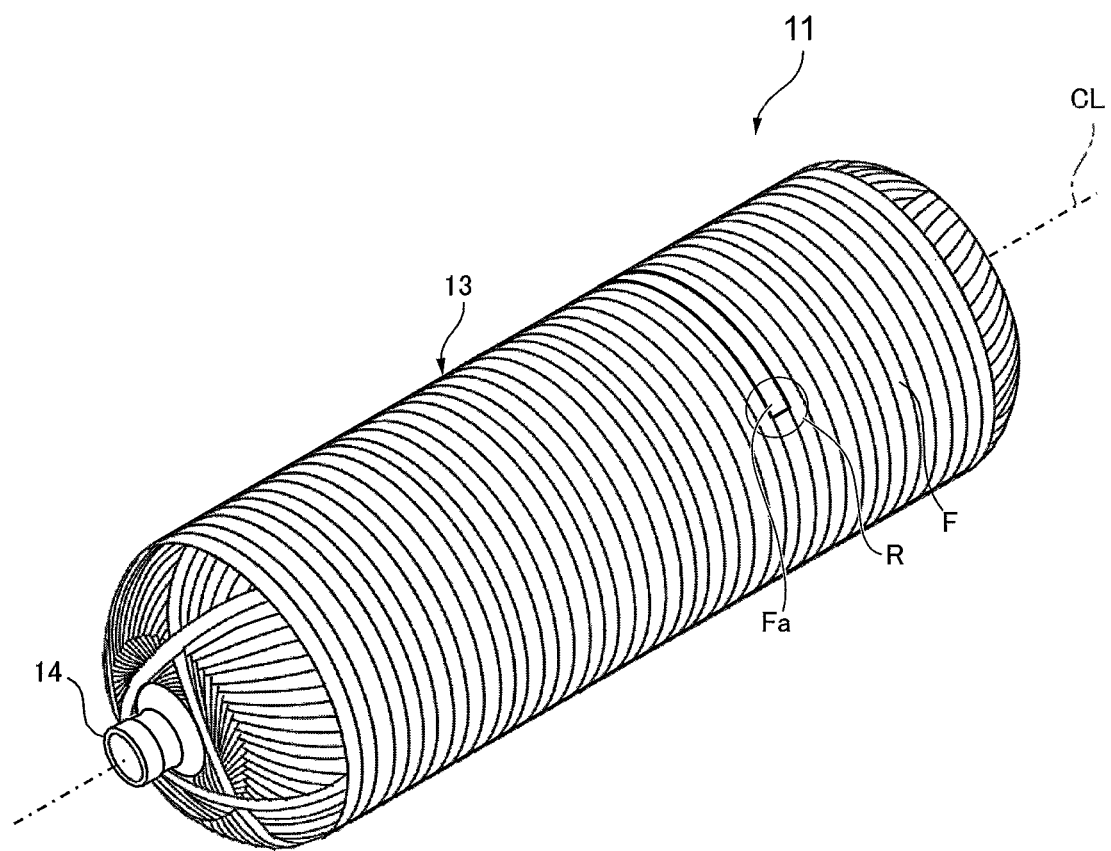
FIG. 2 is a perspective view illustrating the structure of a high-pressure tank having a fiber-reinforced resin layer with its outer periphery formed through hoop winding, the high-pressure tank being produced using the method for producing a high-pressure tank according to the embodiment of the present disclosure.
Figure 3:
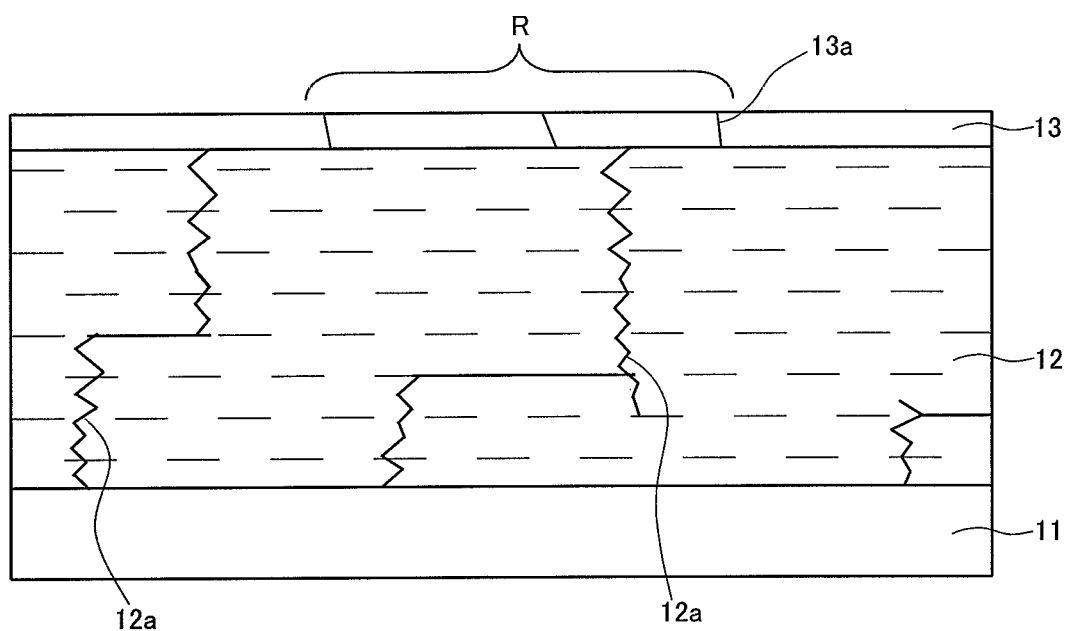
FIG. 3 is an enlarged view of section A of FIG. 1.

Herein, in the present embodiment, as illustrated in FIG. 2 and FIG. 3, the surface resin layer 13 is provided with a crack region R including a plurality of cracks 13a penetrating through the surface resin layer 13 in the thickness direction. The crack region R has a diameter of about 1.5 to 4 times wider than the width of a fiber bundle F, for example. The cracks 13a are formed not entirely, but locally in the surface resin layer 13. Further, one to three crack regions R are provided in the surface resin layer 13, for example.

Further, in the present embodiment, the crack region R includes at least an end Fa of the wound fiber bundle F, and the cracks 13a are formed along the edges of the fiber bundle F. Therefore, the cracks 13a are formed along both the lateral direction (the width direction) and longitudinal direction (the circumferential direction of the liner 11) of the fiber bundle F near the end Fa of the wound fiber bundle F.

The surface resin layer 13 with the cracks 13a generated therein is highly gas permeable, and thus can release the hydrogen gas that has permeated through the liner 11 to the outside without shielding it. Therefore, the surface resin layer 13 does not break due to the increased gas pressure inside the fiber-reinforced resin layer 12.

Figure 4:
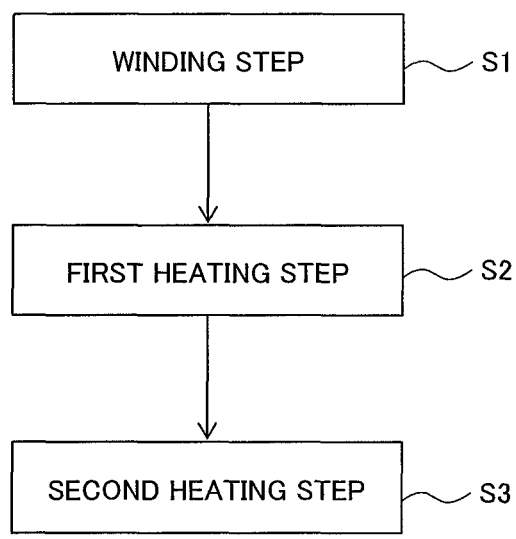
FIG. 4 is a flowchart illustrating the method for producing a high-pressure tank according to the embodiment of the present disclosure.

Next, the method for producing the high-pressure tank 10 according to the embodiment of the present disclosure is described. FIG. 4 is a flowchart illustrating the method for producing the high-pressure tank 10, and describes a step of forming the fiber-reinforced resin layer 12 on the outer surface of the liner 11 to which the mouthpiece 14 and end boss 16 have been attached, and the following steps. As illustrated in FIG. 4, the method for producing the high-pressure tank 10 includes a winding step S1, a first heating step S2, and a second heating step S3. These steps are performed in this order. The winding step S1 is an example of "forming an uncured fiber-reinforced resin layer" of the present disclosure.

In the winding step S1, the aforementioned shaft as a rotating mechanism is attached to the mouthpiece 14 and end boss 16 of the liner 11 so as to rotatably support the liner 11. Then, while the liner 11 is being rotated, the uncured thermosetting resin-impregnated fiber bundle F is wound around the liner 11 so as to cover its outer surface. Examples of winding include helical winding in which winding is performed so as to form a crossing angle of several ten degrees relative to the axis CL (see FIG. 2) of the liner 11, and hoop winding in which winding is performed so as to form nearly a right angle relative to the axis CL (see FIG. 2) of the liner 11. In some cases, the helical winding and hoop winding may be alternately performed. In this step, the uncured fiber-reinforced resin layer 12 is formed on the outer surface of the liner 11.

In the first heating step S2, the uncured fiber-reinforced resin layer 12 is locally heated at a first temperature that is higher than the curing temperature of the thermosetting resin (herein, the epoxy resin). During this time, in the heated region of the fiber-reinforced resin layer 12, the thermosetting resin that has temporarily softened leaches out of the fiber-reinforced resin layer 12 so as to form the surface resin layer 13. The first heating step S2 is performed without the liner 11 rotated unlike the winding step S1. The heated region corresponds to the aforementioned crack region R.

In the present embodiment, the first temperature may be 140 to 240° C. higher than the second temperature (the temperature at which the thermosetting resin is cured) described below. Such temperature setting widens the difference between the first temperature and a predetermined temperature to which the surface resin layer 13 is cooled, thereby increasing the load acting on the surface resin layer 13, so that the cracks 13a become more likely to be generated in the surface resin layer 13, as will be described later.

In addition, the uncured fiber-reinforced resin layer 12 may be locally heated to the first temperature at a temperature increasing rate of 5.3° C./sec or greater, for example, and then retained at the first temperature for a first predetermined duration (for example, for several minutes). Accordingly, the glass transition temperature of the thermosetting resin in the heated region reaches or exceeds the predetermined temperature, so that the curing of the thermosetting resin is completed.

Then, cooling air is blown to the fiber-reinforced resin layer 12 and surface resin layer 13 to forcibly and rapidly cool them from the first temperature to a predetermined temperature (for example, a temperature lower than the glass transition temperature (for example, several ten degrees)). Accordingly, in the aforementioned heated region, a plurality of cracks 13a are generated in the surface resin layer 13 such that they penetrate through the surface resin layer 13 in the thickness direction. Rapidly cooling the surface resin layer 13 can increase the load acting on the surface resin layer 13, so that the cracks 13a become more likely to be generated in the surface resin layer 13. The cooling rate for rapidly cooling the fiber-reinforced resin layer 12 and surface resin layer 13 may be 12.5° C./sec or greater, for example.

Figure 5:
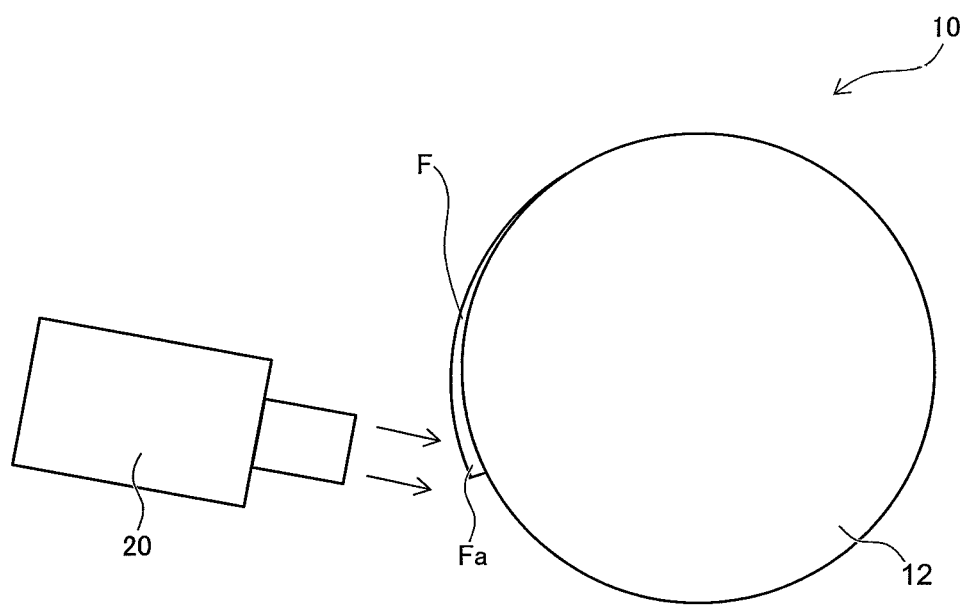
FIG. 5 is a view for illustrating a first heating step of the method for producing a high-pressure tank according to the embodiment of the present disclosure.

Further, as illustrated in FIG. 5, in the present embodiment, the region of the uncured fiber-reinforced resin layer 12 to be locally heated includes the end Fa of the wound fiber bundle F. Herein, the region including the end Fa of the wound fiber bundle F is heated with hot air blown from a blower 20 such that the end Fa is pressed against the liner 11. Accordingly, in the first heating step S2, the end Fa of the wound fiber bundle F can be secured onto the surface of the fiber-reinforced resin layer 12. Thus, a step of manually securing the end Fa of the wound fiber bundle F can be eliminated. It should be noted that since the curing of the thermosetting resin at the end Fa of the wound fiber bundle F has already been completed, the end Fa of the wound fiber bundle F will not come off, which would otherwise occur due to softened thermosetting resin at the end Fa of the fiber bundle F, in the second heating step S3.

Further, since the fiber-reinforced resin layer 12 has steps formed therein along the edges of the fiber bundle F, the stress is intensively exerted on the edges of the fiber bundle F in cooling. Thus, the cracks 13a are generated along the edges of the fiber bundle F, that is, along the longitudinal direction of the fiber bundle F (the circumferential direction of the liner 11). In the present embodiment, since the heated region includes the end Fa of the wound fiber bundle F, the cracks 13a are also generated in the width direction of the fiber bundle F in the heated region.

Furthermore, since the region of the uncured fiber-reinforced resin layer 12 to be locally heated has a diameter equal to or greater than (for example, about 1.5 to 4 times) the width of the fiber bundle F, at least one of the edges of the end Fa of the wound fiber bundle F is within the region to be heated. Therefore, one or more cracks 13a are surely generated within the heated region.

In the second heating step S3, the high-pressure tank 10 is entirely heated at the second temperature (the curing temperature of the thermosetting resin or a temperature slightly higher than the curing temperature) lower than the first temperature. Accordingly, in the entire high-pressure tank 10 (excluding the heated regions in the first heating step S2), the thermosetting resin that has softened leaches out of the fiber-reinforced resin layer 12, so that the surface resin layer 13 is formed. It should be noted that the second heating step S3 is performed while the liner 11 is being rotated, unlike the first heating step S2. Further, in the second heating step S2, the high-pressure tank 10 is entirely heated through induction heating, for example.

The high-pressure tank 10 is entirely heated until its temperature reaches the second temperature, and is retained at the second temperature for a second predetermined duration (for example, for several 10 to several 100 minutes) longer than the first predetermined duration. Accordingly, the glass transition temperature of the thermosetting resin of the entire fiber-reinforced resin layer 12 and surface resin layer 13 reaches or exceeds the predetermined temperature, so that the curing of the thermosetting resin is completed. Then, the fiber-reinforced resin layer 12 and surface resin layer 13 are gradually cooled until the temperature becomes the glass transition temperature of the thermosetting resin (at a cooling rate slower than the cooling rate in the air), and are then cooled with cooling air.

In the aforementioned manner, the high-pressure tank 10 with the surface resin layer 13 locally having the cracks 13a generated therein can be obtained.

It should be noted that when the fiber-reinforced resin layer 12 is heated in the second heating step S3, voids (not illustrated) are generated inside the fiber-reinforced resin layer 12 due to the air that has entered the gaps between the fiber bundles F in the winding step S1 and the gas generated from the thermosetting resin. Further, when the liner 11 is filled with a high-pressure gas for testing the high-pressure tank 10 for its pressure resistance or the like, a load acts on the fiber-reinforced resin layer 12, thereby generating cracks 12a (see FIG. 3) originated from the voids in the fiber-reinforced resin layer 12. Since the voids are more likely to be generated along the edges of the fiber bundle F, the cracks 12a are also more likely to be generated along the edges of the fiber bundle F.

As described above, the method of the present embodiment includes the first heating step S2 in which the uncured fiber-reinforced resin layer 12 is locally heated at the first temperature, so that the thermosetting resin leaches out of the heated region of the uncured fiber-reinforced resin layer 12 so as to form the surface resin layer 13, and the surface resin layer 13 is cured so as to have the cracks 13a generated therein as well, and the second heating step S3 in which the high-pressure tank 10 is entirely heated so as to obtain the high-pressure tank 10 with the surface resin layer 13 locally having the cracks 13a generated therein. In a high-pressure tank 10 produced as such, the gas (the gas inside the fiber-reinforced resin layer 12) that has permeated through the liner 11 can be released to the outside through the cracks 13a in the surface resin layer 13, and thus, sudden release of the gas, which would otherwise occur if the surface resin layer breaks due to the increased gas pressure inside the fiber-reinforced resin layer 12, can be suppressed. As a result, strange noise generated due to the break of the surface resin layer 13 can also be suppressed.

Further, since a solvent need not be applied over the uncured surface resin layer 13, the quality of the high-pressure tank 10 is not deteriorated due to a solvent penetrating through the fiber-reinforced resin layer 12. In addition, since the cracks 13a are only locally generated in the surface resin layer 13, the strength of the high-pressure tank 10 hardly decreases.

Furthermore, as described above, the region to be locally heated in the first heating step S2 includes the end Fa of the wound fiber bundle F. In such a method, a step of securing the end Fa of the wound fiber bundle F need not be provided separately from the first heating step S1, and thus, the production time can be reduced. In addition, since the cracks 13a are generated along both the lateral direction (the width direction) and longitudinal direction of the fiber bundle F at the end Fa of the wound fiber bundle F, the cracks 12a in the fiber-reinforced resin layer 12 and the cracks 13a in the surface resin layer 13 are allowed to surely cross each other (be coupled together). Therefore, the gas inside the fiber-reinforced resin layer 12 can surely be released to the outside through the cracks 13a in the surface resin layer 13.

Moreover, as described above, in the first heating step S2, hot air is locally blown to the uncured fiber-reinforced resin layer 12, so that the uncured fiber-reinforced resin layer 12 can easily and locally be heated.

Next, the advantageous effects of the present disclosure will be further specifically described by way of Example.

Example

In Example, in the winding step S1, a bundle (fiber bundle F) of uncured epoxy resin-impregnated carbon fibers was wound around the liner 11 so that the uncured fiber-reinforced resin layer 12 was formed on the outer surface of the liner 11.

In the first heating step S2, the uncured fiber-reinforced resin layer 12 was locally heated with hot air blown thereto at a temperature of about 320 to 395° C. for two minutes or longer, at a temperature increasing rate of about 5.3° C./sec or greater. Then, the fiber-reinforced resin layer 12 and surface resin layer 13 were forcibly and rapidly cooled with cooling air blown thereto until the temperature became several ten degrees C. The cooling rate at this time was about 12.5° C./sec or greater.

In the second heating step S3, the high-pressure tank 10 was entirely heated at about 160° C. through induction heating, and was then held at about 160° C. for a predetermined duration, so that curing of the epoxy resin was completed. Thereafter, the fiber-reinforced resin layer 12 and surface resin layer 13 were gradually cooled (at a cooling rate slower than the cooling rate in the air) until the temperature became about 110° C. (the glass transition temperature), and were then cooled with cooling air.

The other procedures of the production method in Example were the same as those of the aforementioned embodiment.

Comparative Example

In Comparative Example, the high-pressure tank 10 was produced without the first heating step S2 performed, that is, without the uncured fiber-reinforced resin layer 12 locally heated. The winding step S1 was performed in the same manner as in Example. Specifically, in the winding step S1, a bundle (fiber bundle F) of uncured epoxy resin-impregnated carbon fibers was wound around the liner 11, so that the uncured fiber-reinforced resin layer 12 was formed on the outer surface of the liner 11.

The winding step S1 was followed by the second heating step S3. In the second heating step S3, the high-pressure tank 10 was entirely heated at about 160° C. through induction heating, and was then held at about 160° C. for a predetermined duration, so that curing of the epoxy resin was completed. Thereafter, the fiber-reinforced resin layer 12 and surface resin layer 13 were gradually cooled until the temperature became about 110° C. (the glass transition temperature), and were then cooled with cooling air.

Figure 6:
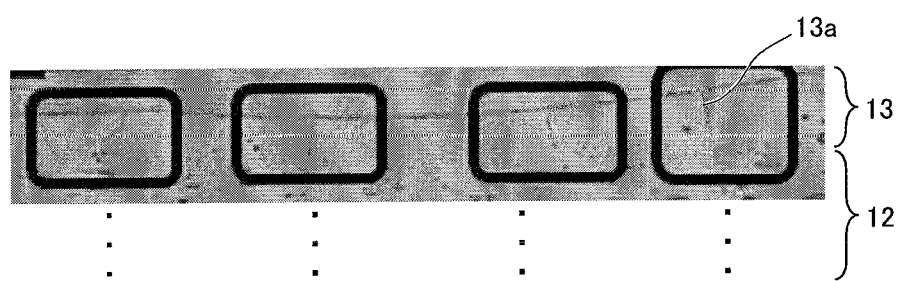
FIG. 6 is an enlarged view illustrating the structure of the periphery of a surface resin layer of a high-pressure tank produced using a method for producing a high-pressure tank according to Example.

Next, the cross section of the high-pressure tank 10 according to each of Example and Comparative Example was observed. FIG. 6 illustrates the cross section around the heated region of the high-pressure tank 10 according to Example and FIG. 7 illustrates the same according to Comparative Example.

Figure 7:
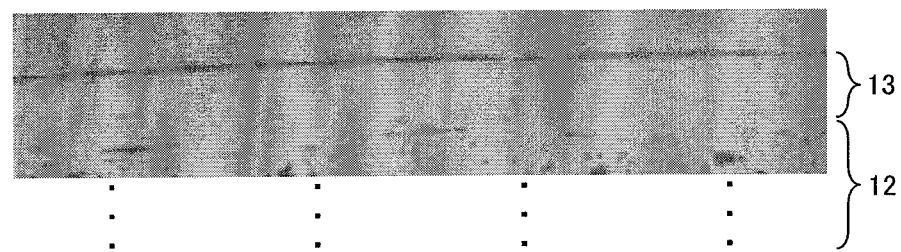
FIG. 7 is an enlarged view illustrating the structure of the periphery of a surface resin layer of a high-pressure tank produced using a method for producing a high-pressure tank according to Comparative Example.

FIG. 6 can confirm that in the high-pressure tank 10 according to Example, the cracks 13a were generated in the surface resin layer 13, while FIG. 7 can confirm that in the high-pressure tank 10 according to Comparative Example, the cracks 13a were not generated in the surface resin layer 13.

It should be noted that all the aspects of the embodiment disclosed herein are mere examples and are not limiting factors. The scope of the present disclosure is defined in the claims, not in the aforementioned description of the embodiment. Further, the present disclosure encompasses any modifications within the scope of the claims and equivalents thereof.

For example, although the aforementioned embodiment illustrates an example in which the fiber-reinforced resin layer 12 is locally heated with hot air in the first heating step S2, the present disclosure is not limited thereto. In the first heating step S2, the heating may be performed through, for example, infrared heating, induction heating, or contacting the layer with a heated tool.

What is claimed is:

1. A method for producing a high-pressure tank including a resin liner, a fiber-reinforced resin layer covering an outer surface of the liner, and a surface resin layer covering an outer surface of the fiber-reinforced resin layer, the method comprising:

winding a thermosetting resin-impregnated fiber bundle around the outer surface of the liner so as to form an uncured fiber-reinforced resin layer on the outer surface of the liner;

a first heating operation in which a region of the uncured fiber-reinforced resin layer is locally heated at a first temperature, such that a portion of the thermosetting resin leaches out of said region of the uncured fiber-reinforced resin layer so as to form the surface resin layer, wherein the surface resin layer is cured;

cooling the heated and cured surface resin layer to a second temperature that is lower than the first temperature, such that cracks are generated in the surface resin layer; and a second and subsequent heating operation in which the high-pressure tank is entirely heated at a third temperature that is lower than the first temperature and higher than the second temperature, such that the fiber-reinforced resin layer is cured, so as to obtain the high-pressure tank with the surface resin layer having said cracks.

2. The method for producing a high-pressure tank according to claim 1, wherein the region that is locally heated in the first heating operation includes an end of the fiber bundle that is wound.

3. The method for producing a high-pressure tank according to claim 1, wherein the first heating operation includes heating the uncured fiber-reinforced resin layer by locally blowing hot air to the uncured fiber-reinforced resin layer.

* * * * *